United States Patent [19]
Heidenreich

[11] Patent Number: 5,215,174
[45] Date of Patent: Jun. 1, 1993

[54] OVER-RUNNING CLUTCH

[75] Inventor: David C. Heidenreich, Akron, Ohio

[73] Assignee: Power Transmission Technology, Inc., Sharon Center, Ohio

[21] Appl. No.: 886,196

[22] Filed: May 21, 1992

[51] Int. Cl.$^5$ .................. F16D 41/07; F16D 13/74
[52] U.S. Cl. .................. 192/45.1; 192/112; 192/113 B
[58] Field of Search .......... 192/45.1, 41 A, 41 R, 192/113 B, 112; 74/661

[56] References Cited

U.S. PATENT DOCUMENTS

| | | | |
|---|---|---|---|
| 1,951,875 | 3/1934 | Laabs | 74/661 |
| 2,551,980 | 5/1951 | Tholl | 192/45.1 X |
| 2,670,825 | 3/1954 | Cherry | 192/45.1 |
| 3,550,737 | 12/1970 | Kent | 192/45.1 |
| 4,068,748 | 1/1978 | Charchian et al. | 192/45.1 X |
| 4,191,279 | 3/1980 | Brown | 192/113 B X |
| 4,291,795 | 9/1981 | Charchian et al. | 192/45.1 X |
| 4,457,269 | 7/1984 | Beardmore | 192/41 R X |
| 4,757,887 | 7/1988 | Ostrander et al. | 192/41 A |

FOREIGN PATENT DOCUMENTS

| | | | |
|---|---|---|---|
| 0426220 | 5/1991 | European Pat. Off. | 192/45.1 |
| 1434181 | 10/1988 | U.S.S.R. | 192/45.1 |

Primary Examiner—Rodney H. Bonck
Attorney, Agent, or Firm—Renner, Kenner, Greive, Bobak, Taylor & Weber

[57] ABSTRACT

An over-running clutch is provided with a cup shaped housing which axially receives a sprag clutch therein. A sprocket is connected to the housing for a low power and low speed input which is coupled to an inner race of the clutch. The outer race of the clutch is connected to an output hub. The sprocket lies within a plane that intersets the clutch assembly between a pair of outboard bearings. Sprags are received within a cavity containing lubricant, such cavity being accessible through a bore in the output adapter. Additionally, the cavity is sealed by means of a seal which may be greased by external access.

13 Claims, 2 Drawing Sheets

OVER-RUNNING CLUTCH

TECHNICAL FIELD

The invention herein resides in the art of power transmission devices and, more particularly, to an over-running clutch. Specifically, the invention relates to such a clutch adapted to interconnect a low speed secondary drive motor through a chain and sprocket to a high speed primary power drive system. The over-running clutch is operative to effectively disconnect the low speed drive motor from the primary drive system when a primary drive motor is activated to drive the system.

BACKGROUND ART

In many power drive systems, when the primary drive motor stops, the entire system shuts down. Often, it is difficult to restart the system anew from the stopped condition or it is important to keep the system running at a slow speed. For example, conveyor systems in mining and other industries require large drive motors to move heavy loads and, when such conveyors are operated in cold weather environments, the conveyors may ice and actually freeze in the stopped position. In such systems, there is a need to provide a low speed secondary drive to continue to move the conveyor belt during idle time to prevent freeze up.

Previously, over-running clutches have been used to directly interconnect the low speed drive to the primary drive system. However, such over-running clutches have not been well suited to interconnect with a chain or sprocket driven low speed secondary drive motor. Previously known over-running clutches have not been conducive to use outdoors and in adverse environmental conditions.

DISCLOSURE OF INVENTION

In light of the foregoing, it is a first aspect of the invention to provide an over-running clutch which is given to implementation with chain and sprocket driven systems, particularly such systems in which the low speed motor is interconnected by a chain and sprocket to the over-running clutch.

Still a further aspect of the invention is the provision of an over-running clutch which is conducive to operation in adverse environments and in the outdoors.

Still a further aspect of the invention is the provision of an over-running clutch which allows for optimum force transfer by allowing the positioning of the motor sprocket and clutch sprocket to define a plane which lies between a pair of bearings interposed between the clutch races for optimum bearing load distribution.

An additional aspect of the invention is the provision of an over-running clutch which is highly reliable in operation.

Yet another aspect of the invention is the provision of an over-running clutch which is conducive to implementation with state of the art elements and techniques.

The foregoing and other aspect of the invention which will become apparent as the detailed description proceeds are achieved by an over-running clutch, comprising: a cup shaped housing; a shaft axially received within said housing and connected thereto; an input drive sprocket received upon said housing and connected thereto; a clutch having an inner race and an outer race, said inner race being connected to said shaft; and an output adapter connected to said outer race.

Other aspects of the invention which will become apparent herein are attained by an over-running clutch, comprising: a cylindrical housing having a sprocket received thereon; a shaft axially received within and connected to said housing; an output hub; and a clutch interposed between said shaft and said output hub.

DESCRIPTION OF DRAWINGS

For a complete understanding of the objects, techniques, and structure of the invention reference should be made to the following detailed description and accompanying drawings wherein.

BEST MODE FOR CARRYING OUT THE INVENTION

Figure 1:
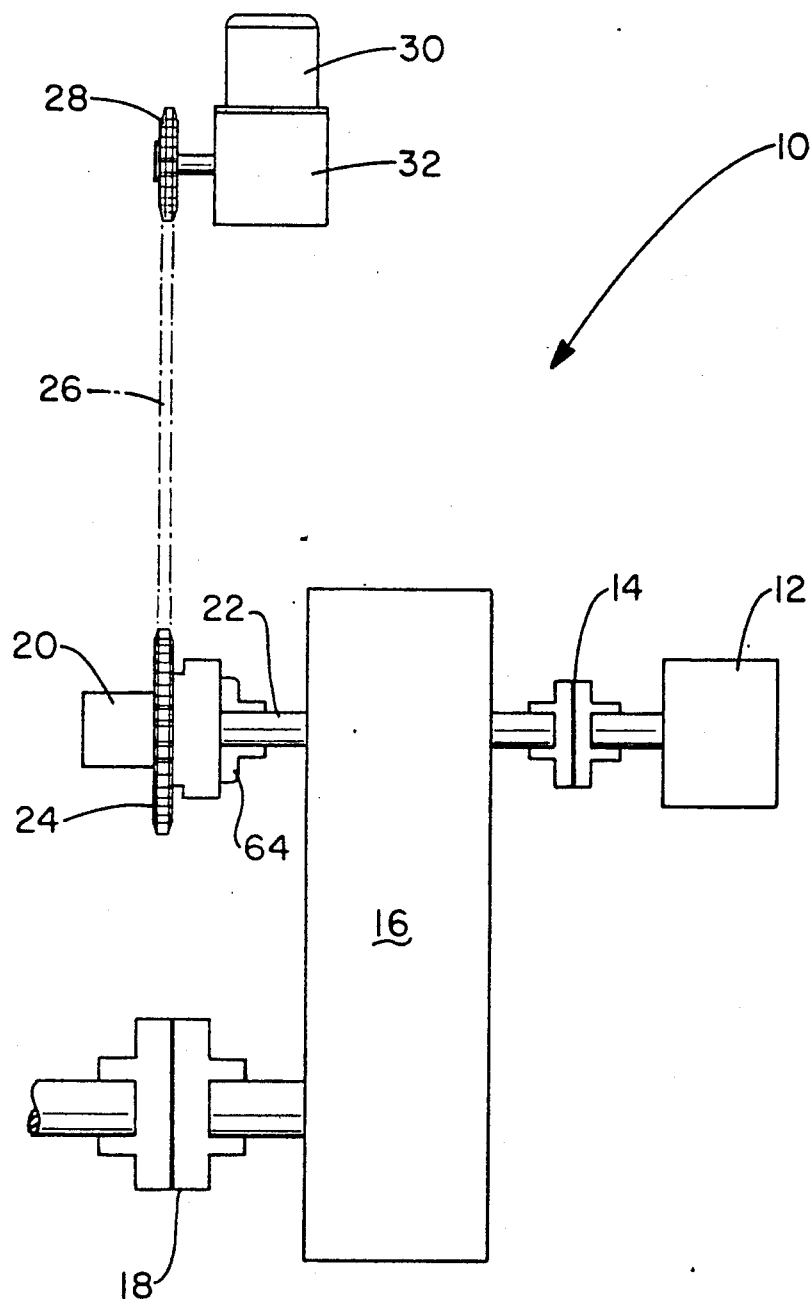
FIG. 1 is a schematic diagram of a power drive system employing a chain driven idle motor and the over-running clutch of the invention.

Referring now to the drawings and more particularly FIG. 1, it can be seen that a drive system according to the invention is designated generally by the numeral 10. A high speed primary motor or engine 12 is connected through a coupling 14 to a primary gear reducer 16 as shown. The output of the gear reducer 16 is the coupling 18 which is interconnected to a conveyor or other implement to be driven by the motor or engine 12. Also connected to the gear reducer 16 is an over-running clutch 20, connected thereto through a rigid half coupling to shaft 22. As shown, a sprocket 24 of the over-running clutch coupling 20 is interconnected by a chain 26 to a sprocket 28 which is driven by the secondary motor or engine 30 through a secondary reducer 32.

In operation, the drive system 10 functions as follows. Power from the primary drive motor or engine 12 is transferred to the coupling 18 through the motor coupling 14 and primary gear reducer 16. During this operation, the over-running clutch 20 is freewheeling, such that none of the power from the motor 12 is transferred through the chain and sprocket assembly 24, 26, 28 to the secondary motor 30. Accordingly, the freewheeling nature of the over-running clutch 20 prevents any rotation or damage to the motor 30. When operation of the motor 12 terminates, the over-running clutch 20 serves to provide power transfer from the secondary motor 30 through the secondary gear reducer 32 to the primary gear reducer 16. With the motor 30 being low power and operating through the secondary and primary gear reducers, the output coupling 18 and accompanying conveyor or the like is caused to turn at a slow speed, precluding freeze-up.

Figure 2:
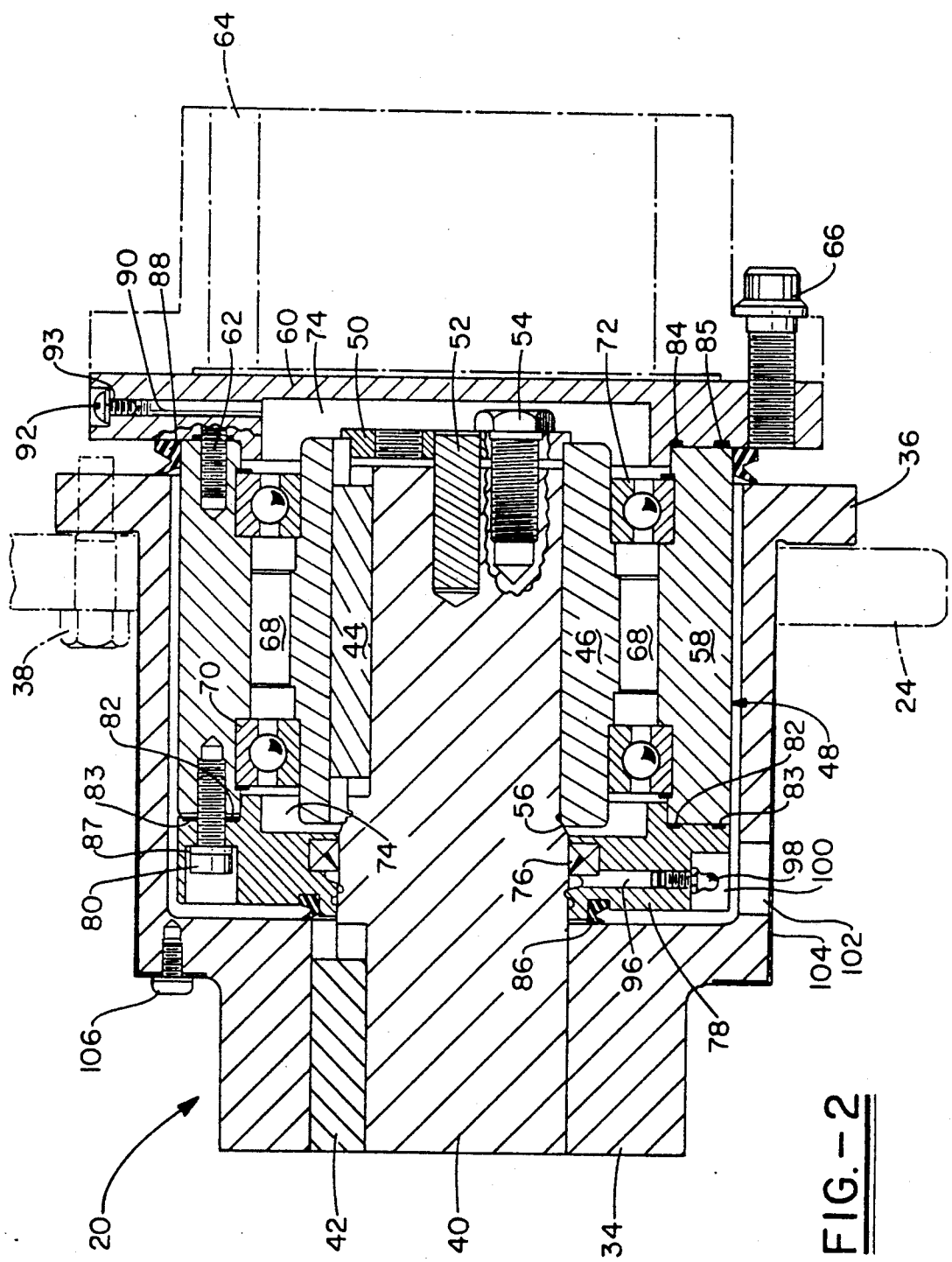
FIG. 2 is a cross sectional view of the over-running clutch according to the invention.

As shown in FIG. 2, the over-running clutch 20 is provided with a cup-shaped housing 34 having a circumferential flange 36 thereabout adapted to receive a sprocket 24 by attachement bolts 38. The shaft 40 is axially received within the housing 34 and connected thereto by a key 42 or other appropriate means. In like manner, a key 44 secures the shaft 40 to an inner race 46 of a clutch 48. In the preferred embodiment of the invention, the clutch 48 is of the centrifugal throw-out sprag type, which allows the sprags to lift off the inner race during high speed over-running and thereby eliminating wear. As shown, the clutch 48 is substantially coaxial with the sprocket 24 such that the sprockets 24, 28 define a plane which passes through the clutch 48 and is normal to the central axis thereof.

A keeper plate 50 is maintained in axial alignment with the shaft 40 by means of a dowel pin 52 passing through the keeper plate 50 and into the center of the shaft 40. Bolts 54 secure the keeper plate 50 to the shaft 40 in such a manner as to maintain the inner race 46 concentric upon the shaft 40 with engagement at the seat 56 being maintained about the entirety of the respective circumferences of the shaft 40 and the inner race 46.

The clutch 48 also includes an outer race 58 which is concentric with the inner race 46 and which is connected to an adapter plate 60 by means of a plurality of bolts 62. A rigid half coupling 64 is secured to the adapter plate 60 by means of appropriate bolts 66 as shown. It will be appreciated that the rigid half coupling 64 is adapted to receive the shaft 22 for communication with the gear reducer 16, as shown in FIG. 1.

Interposed between the inner race 46 and outer race 58, and connected to each, is a centrifugal lift off sprag 68. As is well known and understood by those skilled in the art, the sprag 68 operates to transfer rotational motion from the inner race 46 to the outer race 58 when rotational force is applied in one direction, and to be free wheeling when the outer race rotates at a higher speed in the same direction. Accordingly, motion transfer from the sprocket 24 through the housing 34 and shaft 40 to the inner race 46 may be transferred to the outer race 58 and, accordingly, attached to the adapter plate 60, coupling 64, and shaft 22 to achieve rotational movement of the shaft 22. In contradistinction, the clutch 48 is freewheeling with respect to forces imparted from the shaft 22 to the outer race 58. The freewheeling mode of operation between the inner race 46 and outer race 58 is facilitated by the bearings 70, 72, provided at opposite ends of the pair of races, as well known and understood in the art. Again, as is shown in FIG. 2, the sprockets 24, 28 preferably define a plane which cuts between the bearings 70, 72 to achieve optimum load distribution.

A cavity 74 is defined between the inner race 46 and outer race 58 and retains the sprags 68 and bearings 70, 72. The cavity 74 is filled with oil or appropriate lubricant for such bearings. A seal ring 76 is interposed between the shaft 40 and a seal cover 78 which is secured to the outer race 58 by means of bolts 80. O-ring seals 82, 83 provide concentric rings in sealing engagement between the seal cover 78 and the outer race 58 with the interconnecting bolts 80 passing therebetween. Accordingly, the seal 76 seals one end of the cavity 74. The opposite end of the cavity 74 is sealed by concentric O-rings 84, 85 interposed between the outer race 58 and the output adapter plate 60, the bolts 62 passing through the ring defined by the pair of O-rings 84. O-ring seals 87 seal around bolts 80, 62 which are chamfered for such purpose.

A V-ring seal 86 is interposed between and among the seal cover 78, and housing 34. In similar manner, a V-ring seal 88 is interposed between and among the output adapter 60, housing 34, and outer race 58. The V-ring seals 86, 88 are provided to prevent contaminants from entering from the ambient to the interior of the over-running clutch coupling 20, for such contaminants would adversely impact the operation thereof.

As an important feature of the invention, a bore or passage 90 extends radially from the cavity 74 to the exterior of the adapter plate 90. An outer end of the bore 90 is threaded to accommodate receipt of an access bolt 92 and seal 93 which allows for sealing communication from the ambient to the cavity 74. Accordingly, lubricating oil and the like may be introduced into the cavity 74 and be changed as necessary to maintain operational integrity.

Also presented as an important feature of the invention is the bore or passage 96 which receives a grease fitting 98 at one end thereof and is in juxtaposition and communication with the seal 76 at the other end thereof. The bore 96 and grease fitting 98 allow for the introduction of grease to the seal 76 to purge contaminants therefrom and to lubricate the same. Such servicing is important to maintain the operational integrity of the over-running clutch coupling 20 of the invention. As illustrated, a counter bore 100 is provided in the seal cover 78 for receipt of the grease fitting 98, when such counter bore 100 is in alignment with an access hole 102 within the housing 34. Accordingly, selective access can be made to the grease fitting 98 from outside of the over-running clutch coupling 20.

It will be appreciated that a number of grease fittings 98, bores 96, and access openings 102 may be circumferentially spaced about the coupling 20. To preclude the entrance of contaminants to the interior of the clutch coupling 20 through the opening 102, a cup shaped shield 104 is received over a portion of the housing 34 which includes the openings 102. As illustrated, the shield 104 is secured to the housing 34 by means of plurality of circumferentially spaced bolts 106.

It should now be appreciated that in the low speed mode of operation, a low power motor or engine 30 drives the sprocket 24 which, through the housing 34 and shaft 40, engages the sprag clutch 48 through the centrifugal sprags 68. Accordingly, the inner race 46 and outer race 58 rotate together, causing corresponding rotation of the output adapter 60, coupler 64, and shaft 22. The force of the motor or engine 30 is thus transferred through the gear reducer 16 to the output shaft 18 to assure low speed operation of the conveyor or other driven implement.

When the power is input from the high power and high speed primary motor or engine 12, it is coupled through the gear reducer 16 to the output shaft 18 in a manner well known and understood in the art. The over-running clutch 20 free wheels to prevent rotation of and damage to the secondary drive 30, 32. The centrifugal lift off sprags 68 are disengaged from the inner race 46 during the high speed rotation of shaft 22, eliminating wear and providing for extremely long life of the over-running clutch 20. The secondary motor 30 may optimally continue to run concurrently with the operation of the high speed and high power motor 12. Upon termination of the operation of the motor 12, the clutch 48 again engages to assure that the low speed operation continues.

Thus it can be seen that the objects of the invention have been satisfied by the structure presented above. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be made to the following claims.

What is claimed is:

1. An over-running clutch, comprising:
   a cup-shaped housing;
   a shaft axially received within said housing and connected thereto;

an input drive sprocket received upon said housing and connected thereto;

a clutch received within said cup-shaped housing and having an inner race and an outer race, said inner race being connected to said shaft;

an output flange adapter connected to said outer race; and a pair of axially separated bearings interposed between said inner and outer races, and centrifugal lift off sprags interconnected between said inner and outer races and interposed between said pair of bearings, said clutch and said sprocket being radially aligned and said sprocket being axially maintained between said bearings.

2. The over-running clutch according to claim 1, wherein said pair of bearings and said centrifugal lift off sprags are maintained within a cavity.

3. The over-running clutch according to claim 2, further comprising a seal at an end of said cavity, said seal retained against said shaft by a seal cover.

4. The over-running clutch according to claim 3, wherein a bore passes radially through said seal cover to said seal at a first end thereof, and receives a grease fitting at a second end thereof.

5. The over-running clutch according to claim 4, wherein said housing has an opening therein exposing said grease fitting, and further comprising a shield removably attached to said housing, said shield covering said opening.

6. The over-running clutch according to claim 2, further comprising a bore passing from an external surface of the clutch to said cavity.

7. The over-running clutch according to claim 6, further comprising an adapter plate interposed between said outer race and said output, said bore passing through said adapter plate to said cavity.

8. An over-running clutch, comprising:

a cylindrical housing having a sprocket received thereon;

a shaft axially received within and connected to said housing;

an output flange adapter; and a clutch received within said housing and interposed between said shaft and said output flange adapter, said clutch comprising an inner race connected to said shaft, an outer race connected to said output adapter, first and second bearings interposed between said inner and outer races at opposite ends thereof, and further comprising centrifugal lift off sprags interconnecting said inner and outer races between said first and second bearings, and wherein said first and second bearings and centrifugal lift off sprags are maintained within a cavity filled with a lubricant.

9. The over-running clutch according to claim 8, wherein said cavity is closed by a seal engaged by a seal cover at one end thereof, said seal cover sealing against said outer race.

10. The over-running clutch according to claim 9, wherein said seal cover is characterized by a grease bore passing therethrough and communicating with said seal.

11. The over-running clutch according to claim 10, further comprising a cylindrical shield removably secured to said housing for selectively covering and exposing said grease bore.

12. The over-running clutch according to claim 11, further comprising a plate interposed between said outer race and said output hub, said plate having a bore passing therethrough and into said cavity.

13. The over-running clutch according to claim 12, wherein said sprocket is axially positioned between said first and second bearings. n

* * * * *